US007730601B2

(12) United States Patent
Symossek et al.

(10) Patent No.: US 7,730,601 B2
(45) Date of Patent: Jun. 8, 2010

(54) DEVICE FOR INSERTING CONNECTING ELEMENTS IN THE END FACES AND/OR LONGITUDINAL SIDES OF TECHNICAL WOOD PRODUCTS

(75) Inventors: Ronald Symossek, Wittstock (DE); Matthias Lewark, Kremmen (DE)

(73) Assignee: Kronotec, AG, Lucerne (CH)

( * ) Notice: Subject to any disclaimer, the term of this patent is extended or adjusted under 35 U.S.C. 154(b) by 587 days.

(21) Appl. No.: 11/314,706

(22) Filed: Dec. 21, 2005

(65) Prior Publication Data

US 2006/0162814 A1 Jul. 27, 2006

(30) Foreign Application Priority Data

Dec. 21, 2004 (DE) ...................... 10 2004 062 648

(51) Int. Cl.
*B23P 23/00* (2006.01)

(52) U.S. Cl. .......................... 29/564.6; 29/525; 29/718; 144/242.1; 414/277; 52/582.1

(58) Field of Classification Search ................ 29/564.6, 29/525, 711, 718; 144/242.1; 414/267, 277, 414/790.1; 425/338, 140; 428/60; 271/177; 156/64; 52/582.1; *B23P 23/00*
See application file for complete search history.

(56) References Cited

U.S. PATENT DOCUMENTS

| | | | | |
|---|---|---|---|---|
| 2,577,630 | A * | 12/1951 | Redin | 144/3.1 |
| 2,878,556 | A * | 3/1959 | Heidergott et al. | 29/718 |
| 3,077,271 | A * | 2/1963 | Siempelkamp | 414/267 |
| 3,328,873 | A * | 7/1967 | Schweers | 29/710 |
| 3,750,256 | A * | 8/1973 | Elmer | 29/710 |
| 3,824,058 | A * | 7/1974 | Axer et al. | 425/338 |
| 3,916,629 | A * | 11/1975 | Thompson | 405/283 |
| 4,042,125 | A * | 8/1977 | Falkinger et al. | 414/790.1 |
| 4,065,003 | A * | 12/1977 | Hostettler | 414/277 |
| 4,172,514 | A * | 10/1979 | Shantz et al. | 198/470.1 |
| 4,209,899 | A * | 7/1980 | Dragotta | 29/783 |
| 4,350,484 | A * | 9/1982 | Seeger et al. | 425/140 |
| 4,412,801 | A * | 11/1983 | Pesch | 425/338 |
| 4,509,245 | A * | 4/1985 | Barth et al. | 29/525 |
| 4,635,338 | A * | 1/1987 | Walsh | 29/436 |
| 4,719,688 | A * | 1/1988 | McCrea | 29/445 |
| 5,052,096 | A * | 10/1991 | Fuller et al. | 29/451 |
| 5,542,775 | A * | 8/1996 | Bechtoldt et al. | 403/188 |
| 6,205,641 | B1 * | 3/2001 | Brumley et al. | 29/525 |
| 6,460,242 | B1 * | 10/2002 | Mori et al. | 29/505 |
| 6,521,314 | B2 * | 2/2003 | Tychsen | 428/60 |

(Continued)

FOREIGN PATENT DOCUMENTS

| | | |
|---|---|---|
| CH | 24 980 | 5/1902 |

(Continued)

*Primary Examiner*—Eric A Gates
(74) *Attorney, Agent, or Firm*—Laurence A. Greenberg; Werner H. Stemer; Ralph E. Locher

(57) ABSTRACT

The invention relates to a device for inserting connecting elements in the end faces and/or longitudinal sides of technical wood products, wherein, according to the invention, an inventory for the connecting elements is disposed on a longitudinal side of the conveyor device. Furthermore, a press-in unit is provided, which presses the connecting elements which are fed and held by a transfer arrangement into the groove in the technical wood products.

14 Claims, 4 Drawing Sheets

U.S. PATENT DOCUMENTS

| | | | | |
|---|---|---|---|---|
| 6,568,672 | B2 * | 5/2003 | Keller | 271/177 |
| 6,569,272 | B2 * | 5/2003 | Tychsen | 156/64 |
| 6,578,614 | B1 * | 6/2003 | Loewenthal | 156/358 |
| 6,862,857 | B2 * | 3/2005 | Tychsen | 52/582.1 |
| 2009/0028662 | A1 * | 1/2009 | Babej | 411/180 |
| 2009/0217506 | A1 * | 9/2009 | Schmidt | 29/525 |

FOREIGN PATENT DOCUMENTS

| | | | |
|---|---|---|---|
| DE | 142 293 | | 7/1903 |
| DE | 3316356 | A1 * | 11/1984 |
| DE | 295 06 493 | U1 | 8/1995 |
| DE | 100 34 409 | A1 | 1/2002 |
| EP | 1 582 653 | A1 | 10/2005 |

* cited by examiner

DEVICE FOR INSERTING CONNECTING ELEMENTS IN THE END FACES AND/OR LONGITUDINAL SIDES OF TECHNICAL WOOD PRODUCTS

Incorporation by reference to the original German patent application (file ref.: 10224062648.0/application date 21, Dec. 2004)

BACKGROUND OF THE INVENTION

Field of the Invention

The invention relates to a device for inserting connecting elements in the end faces and/or longitudinal sides of technical wood products.

It is known to produce technical wood products, such as floor panels, furniture boards, MDF boards, HDF boards, OSB boards, etc., in continuous operation. To enable the aforesaid technical wood products to be joined together into larger cohesive structures, such as floors, walls, items of furniture, they are provided on the outer longitudinal sides and/or end faces with connecting elements, generally known as a tongue and groove connection. The connecting elements are in this case milled out of the technical wood product. This has the drawback that the tongues milled out of the wood products can be damaged during transport and break off. In floor panels, in particular, if a tongue is partially broken off, this can lead to complications in assembly at the end faces, resulting in reduced strength in the connection.

From Swiss patent specification 24980, a machine for manufacturing boards from wooden blocks is known. Here, the wooden blocks, which have grooves on two mutually opposing sides, are fed from an inventory in a plurality of rows, lying side by side or one behind the other, to a table with press slides. On the table, tongues are pressed into the grooves in the wooden blocks. The tongues are pressed in from magazines, are stored side by side in the number required, simultaneously into the grooves in the wooden blocks. Once a board has been made, this is removed and the process begins for the next board. With this machine, only a discontinuous production is possible, a larger wood product being formed from individual wood parts. The high pressure involved in pressing in the tongues can easily result in the tongue being fractured or the groove being splintered and hence to the individual parts being poorly joined together with reduced strength. The individual parts can be joined together only at the production site.

The practice has therefore been adopted of milling a groove into the wood products, on the end faces and/or longitudinal sides respectively, and of only inserting the tongues at the finishing stage. This is time-demanding, since the tongues have first to be cut to the desired length and then carefully fitted into the groove in an end face and/or longitudinal side. A crooked application of the tongues can lead to splintering or partial splintering of the groove.

From German Laid-Open Specification 100 34 409 A1, a device for connecting building boards having a core of derived timber product is known. Here the building boards, which are grooved on two mutually opposing side edges, are joined together by a connecting element. The connecting element, a tongue which is known in the timber industry, has on each side, in mirror symmetry to its middle, a plurality of barbs. As a result of the barbs, a better adherence of the tongue in the grooves of the parts to be joined together, for example floor panels to building boards, is achieved. The connecting elements correspond in length to the grooves in the parts to be joined together, the connecting elements being inserted at the finishing site. Here too, the result can often be splintering or partial splintering of the groove and hence a poor connection of the individual wood parts to be joined together.

SUMMARY OF THE INVENTION

The object of the invention is to provide a device in which the connecting elements are joined industrially, in the continuously running production process for the manufacture of technical wood products, for example floor panels, into the end face and/or longitudinal side of the technical wood products.

According to the invention, the object is achieved by a device for inserting connecting elements in end faces and/or longitudinal sides of technical wood products. The device includes a supply of the connecting elements, a press-in unit, and a transfer device for transferring the connecting elements from said supply to said press-in unit. Particular embodiments can be found in the characterizing features of the sub claims.

According to the invention, the device for inserting connecting elements consists of one or more magazines, disposed on a longitudinal side of the conveyor device for the technical wood products, for receiving the connecting elements, which magazines are disposed above or below the conveyor device, a transfer device for transferring the connecting elements from the magazine(s) to the press-in unit; similarly, the connecting elements, coming from an endless inventory, can be fed to the transfer device, in which case they are cut to the desired length directly before or in the transfer device and are fed to a press-in unit which is movable transversely to the direction of feed of the technical wood products, or to an oblique plane disposed transversely to the direction of feed of the technical wood products, or to a press roller as the press-in unit.

In the device according to the invention, the connecting elements, which are made of wood or plastic, are cut to the desired length and, in one variant, are arranged into magazines. In this case, connecting elements of different length or, indeed, of the same length can be deposited in the respective magazines. In the case of the magazines containing same-length connecting elements, an empty magazine can be exchanged for a full magazine during continuous production.

In another variant, prefabricated connecting elements are fed to the transfer device sorted on a belt, positioned in the desired direction.

In a further variant, the inventory for the connecting elements is configured as a sorting pot, which is disposed in a horizontal plane above or below the horizontal plane of conveyance of the wood products. By means of the sorting pot, connecting elements which have been fed in a disorderly manner are delivered to the transfer device singly and in alignment. The transfer device here consists, for example, of a non-synchronized and a synchronized belt conveyor. The non-synchronized belt conveyor has a conveyor belt and a pressure belt. The connecting elements are held between the conveyor belt and the pressure belt of the non-synchronized belt conveyor by clamping and are conveyed by the action of the friction between the surface of the connecting element and the surface of at least one of the two belts. The conveyance is here effected from the horizontal plane of the sorting pot into the horizontal plane of conveyance of the wood products. Following a change of direction of the non-synchronized belt conveyor, which change is realized by means of pulleys, the connecting element is transferred from the non-synchronized belt conveyor to the synchronized belt conveyor. Here, a first connecting element below the synchronized belt conveyor is transported against a stop (not represented) and a second connecting element, following the first connecting element, is transported against the first connecting element, and so on. Both the conveyor belt and the pressure belt of the non-synchronized belt conveyor here slip over the connecting elements, surmounting the friction previously used for the conveyance. The first connecting element is taken up from this virtual stand-by position according to the chosen synchronization of the synchronized belt conveyor, and so on.

In place of the sorting pot, in another variant the use of a cascade sorting for the connecting elements is possible, which, once again, is disposed both above and below the horizontal plane of conveyance of the wood products.

If magazines are used, the individual connecting elements are grasped from a magazine with the transfer device, brought to the height of the groove in the technical wood products and fed to the press-in unit.

The transfer device for the feeding of the connecting elements interacts in a program-controlled manner with the carriers for the technical derived timber products on the conveying track. This ensures that the connecting elements are introduced in a precise-fitting manner into an end-face or longitudinal-side groove in the technical wood products.

In one particular embodiment of the device according to the invention, the connecting elements and the technical wood products are grasped by a common carrier and fed to the finishing operation.

If an oblique plane or a press roller is used as the press-in unit, then the connecting element held by the transfer device is hooked by its end pointing in the direction of feed into the front-situated end of the end-face or longitudinal-side groove in the technical wood products. In the onward conveyance of the technical wood products, the connecting element is forced fully into the groove in the desired manner, and without difficulty, by the oblique plane or the press roller.

If, as the press-in unit, an arrangement working transversely to the conveyor device of the technical wood products is applied, then the connecting element is grasped by the transfer device and brought to the height appropriate to the groove in the technical wood products and held parallel to the dimensions of the technical wood product resting on the conveyor. The connecting element is then forced into the groove by the transversing movement of the press-in arrangement.

The press-in arrangement is driven by a lifting system which is moved linearly or is influenced by a cam runner.

During the transversing movement of the press-in arrangement, this is displaced at the speed of the conveyor belt in the direction of feed. These operations are also, of course, realized in a program-controlled manner.

The technical wood products to be provided with a connecting element are fed to the press-in unit in parallel alignment on the conveyor belt. This is achieved by the carriers, provided on the conveyor belt, for the technical wood products and by a brace disposed on the opposite side of the press-in unit.

The technical wood products acquired with the device according to the invention, with a connecting element inserted on the end face and/or longitudinal side, display a good, positive-locking connection after having been joined together into larger elements. The connection is characterized by very high pull-out values.

The invention shall be explained in greater detail below with reference to the figures, in which:

DESCRIPTION OF THE PREFERRED EMBODIMENTS

Figure 1:
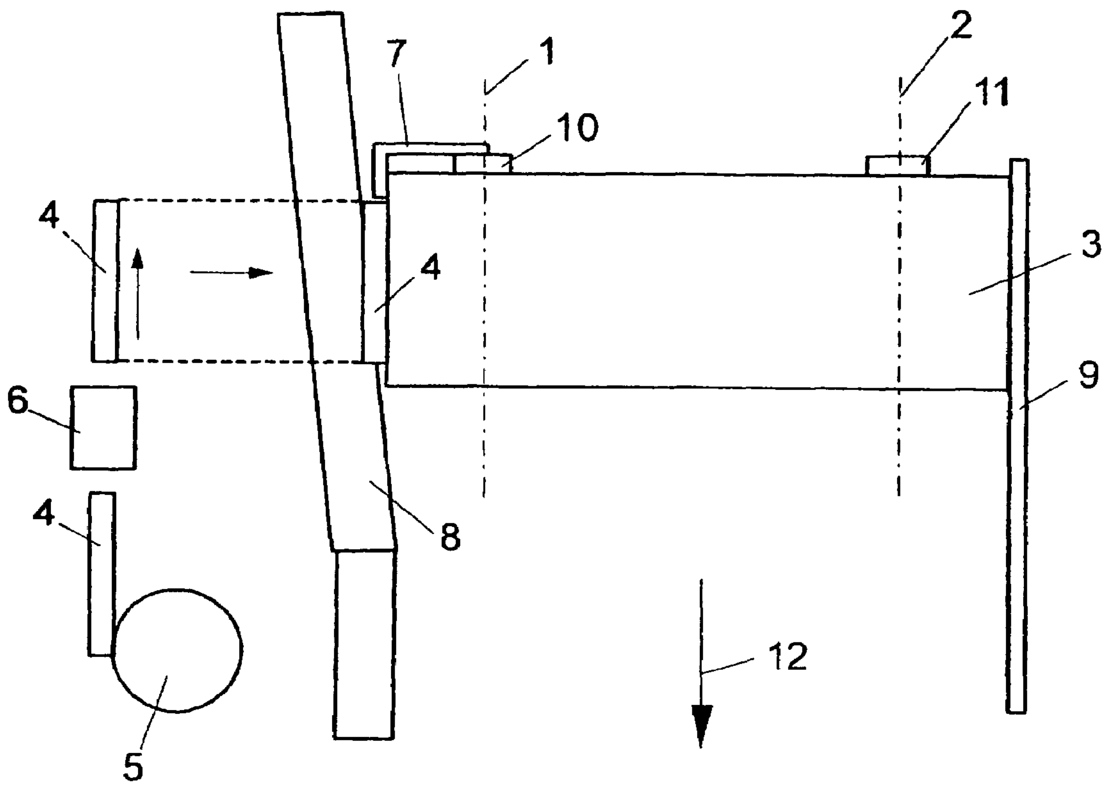
FIG. 1: shows a top view of the device according to the invention for forcing connecting elements into technical wood products, using an oblique plane as the press-in unit.
Figure 2:
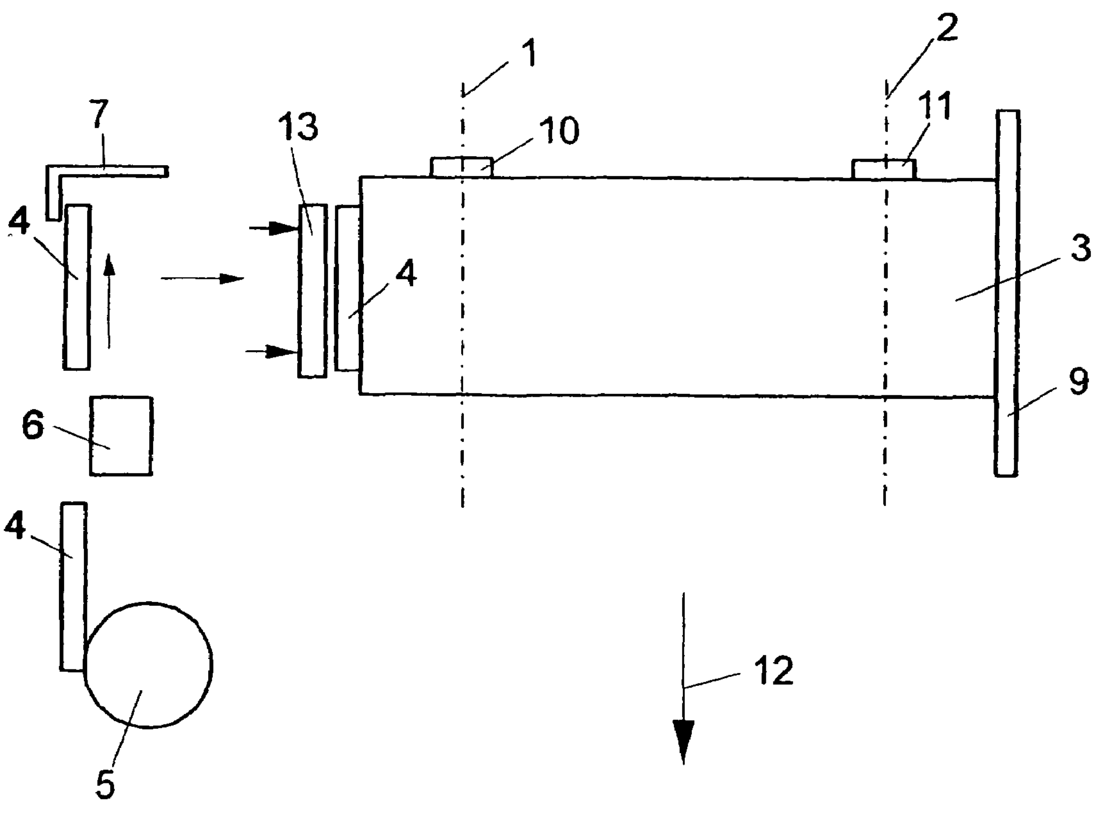
FIG. 2: shows a top view of the device according to the invention for forcing connecting elements into technical wood products, using a press-in unit which is movable transversely to the conveyor device.

FIGS. 1 and 2 show a conveyor device consisting of two parallel conveying chains 1, 2, onto which technical wood products 3, such as floor panels, are fed, lying horizontally. The technical wood products 3 are conveyed continuously past machining bays (not shown) disposed along the conveyor device 1, 2, e.g. for milling the groove on the end face, to the press-in units 8, 13 represented in FIGS. 1 and 2.

If so desired, the connecting elements 4 are cut off in different lengths from an inventory 5 and stored in a tailor-made magazine 6. Preferably, a plurality of magazines 6 are provided. The magazines in question are, for example, shaft magazines, in which the connecting elements 4 are arranged lying one above the other. Here, the connecting elements are aligned in their longitudinal direction already parallel to the direction of conveyance 12 of the conveyor device 1, 2. According to the alignment of the connecting elements 4, the magazine(s) 6 are aligned likewise parallel to the conveyor device 1, 2 and lie laterally next to the conveyor device 1, 2.

The magazine(s) 6 have at the lower end an aperture through which the connecting elements 4 drop downward.

Beneath each of the magazines 6, the connecting elements 4 are grasped by a transfer device 7, which can be moved in the horizontal direction between a front and a rear position, respectively, and is simultaneously raised or lowered to the level of the press-in unit 8/13.

Figure 4:
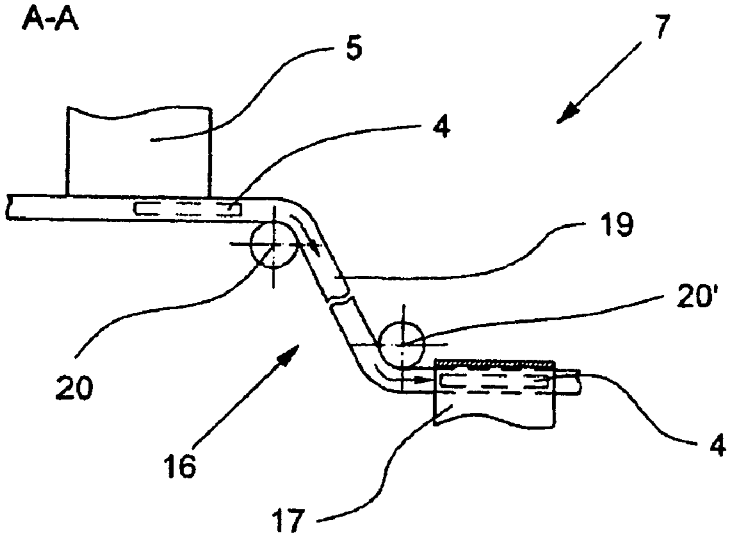
FIG. 4 and FIG. 5: show a top view of the variant comprising sorting of the connecting elements in a sorting pot and a special transfer device.
Figure 5:
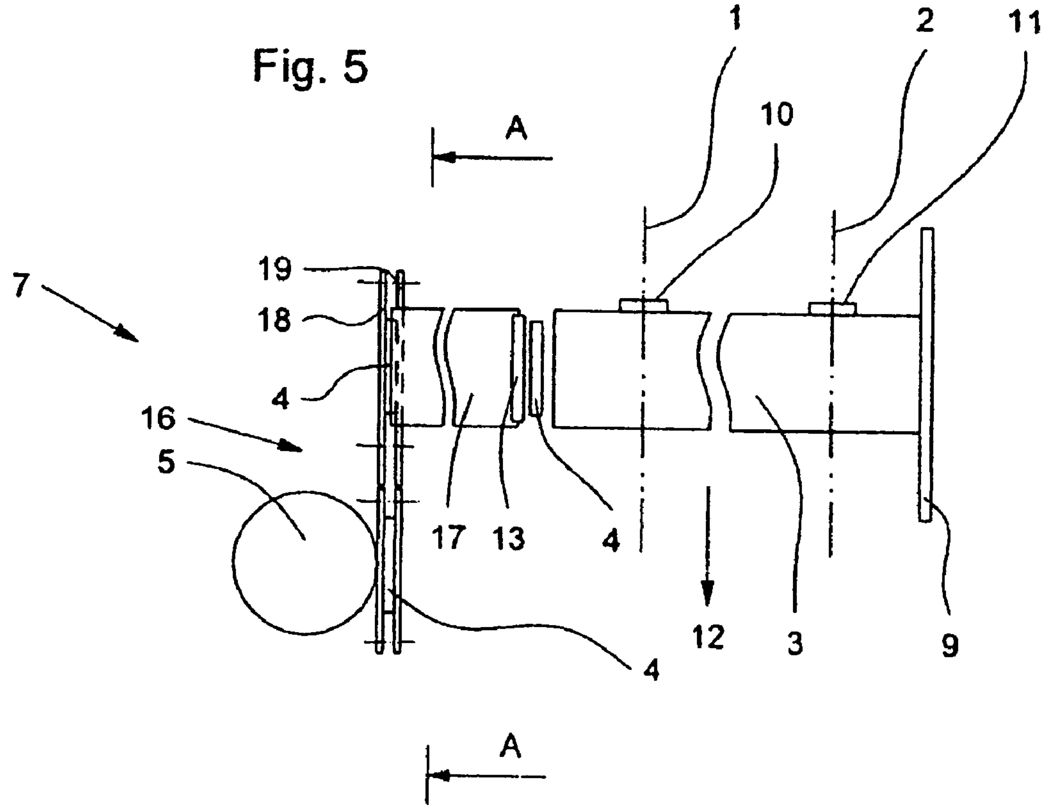

In FIGS. 4 and 5, the inventory 5 is configured as a sorting pot, which is disposed in a horizontal plane above or below the horizontal plane of conveyance of the wood products 3. By means of the sorting pot, connecting elements 4 which have been fed in a disorderly manner are delivered to the transfer device 7 singly and in alignment. The transfer device 7 here consists of a non-synchronized belt conveyor 16 and a synchronized belt conveyor 17. The non-synchronized belt conveyor 16 has a conveyor belt 18 and a pressure belt 19. The connecting elements 4 are held between the conveyor belt 18 and the pressure belt 19 of the non-synchronized belt conveyor by clamping and are conveyed by the action of the friction between the surface of the connecting element 4 and the surface of at least one of the two belts 18, 19. The conveyance is here effected from the horizontal plane of the sorting pot into the horizontal plane of conveyance of the wood products 3. Following a change of direction of the non-synchronized belt conveyor 16 by means of pulleys 20, 20', the connecting element 4 is transferred from the non-synchronized belt conveyor 16 to the synchronized belt conveyor 17. Here, a first connecting element 4 below the synchronized belt conveyor 17 is transported against a stop (not represented) and a second connecting element 4, following the first connecting element 4, is transported against the first connecting element 4, and so on. Both the conveyor belt 18 and the pressure belt 19 of the non-synchronized belt conveyor 16 here slip over the connecting elements 4, surmounting the friction previously used for the conveyance. The first connecting element 4 is taken up from this virtual stand-by position according to the chosen synchronization of the synchronized belt conveyor 17, and transported onward.

Opposite the press-in unit 8, 13, braces 9 are provided on the other side of the conveyor device 1, 2. The braces 9 are arranged such that they can be altered in terms of their distance to the conveyor device 1, 2.

At equal intervals, according to the width of the respective technical wood product 3, carriers 10, 11 are disposed on both chains or similar of the conveyor device 1, 2. As a result of the carriers 10, 11, in concert with the brace 9, a mutually parallel alignment of the technical wood products 3 to be machined, and a constant distance to the press-in unit 8, 13, is ensured. If a technical wood product 3 lies with its end face or longitudinal side congruent to the press-in unit 13, as in FIG. 2, the connecting element 4 held by the transfer device 7, through displacement of the press-in unit 13 transversely to the direction of feed 12 of the conveyor belt 1, 2, is forced into the groove in the adjacent technical wood product 3.

The press-in unit 8 according to FIG. 1 is configured as an oblique plane. In this variant of the device according to the invention, the connecting element 4 held by the transfer device 7 is hooked by its front end pointing in the direction of feed 12 into the front end of the groove in the adjacent technical wood product 3. As the technical wood product 3 advances along the oblique plane, the connecting element 4 is forced smoothly into the groove.

The transfer device 7 serves simultaneously as conveying means for the connecting elements 4 from the magazine 6 and as holding means prior to the press-in operation.

Figure 3:
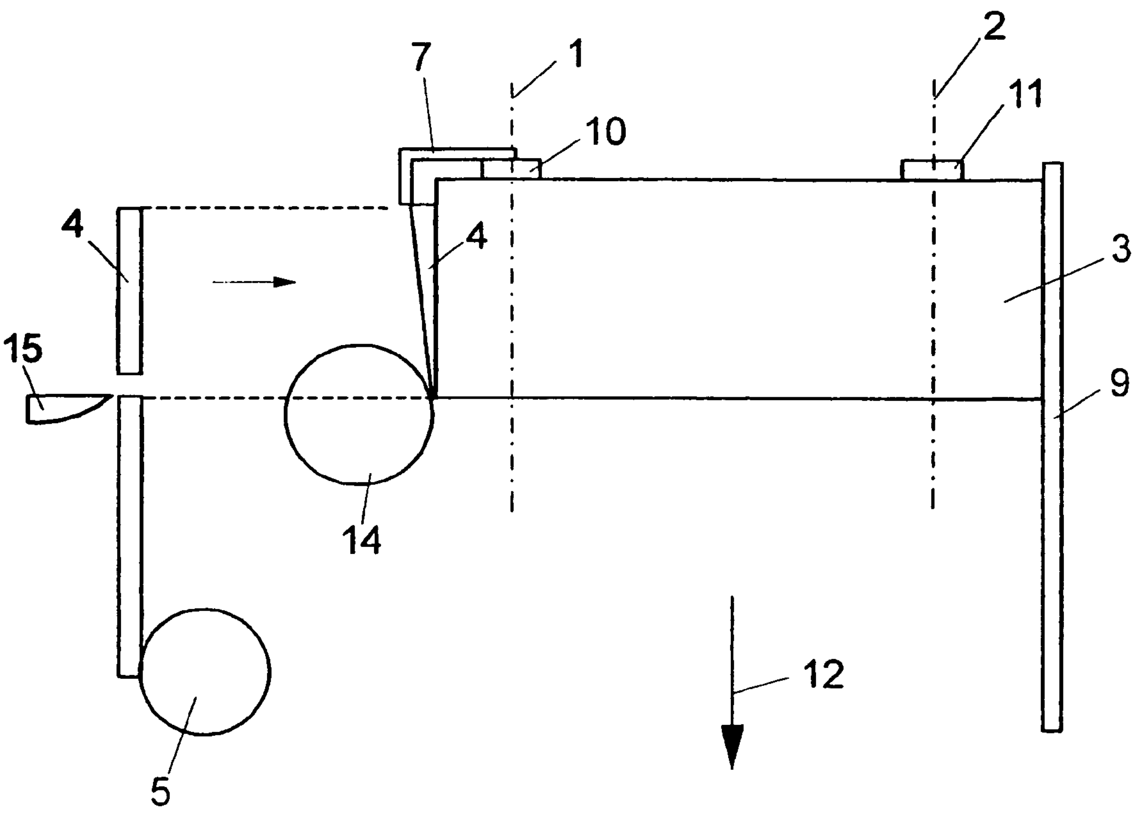
FIG. 3: shows a top view of the device according to the invention for forcing connecting elements into technical wood products, using a press roller as the press-in unit, dispensing with inventory magazines.

In the device according to FIG. 3, a press roller is used as the press-in unit 14 and a storage of the connecting elements 4 in the magazine 6 is dispensed with. The connecting elements 4 are fed from the inventory 5 directly to the transfer device 7 and are there cut to the desired length by means of a cutting device 15 and, as already performed in the press-in unit according to FIG. 1, are hooked into the groove and pressed in place.

We claim:

1. A device for inserting wooden or plastic connecting elements in end faces of technical wood products continuously conveyed along the device, the technical wood products having two opposing planar surfaces, the end faces being sides connecting the planar surfaces to each other, the end faces having a relatively small area compared to the two opposing planar surfaces, the end faces having end-face grooves for receiving the connecting elements, the device comprising:

a supply of the connecting elements, whereby the connecting elements are supplied from an endless inventory;

a press-in unit configured for pressing the connecting elements into the grooves in the end faces of the technical wood products, said press-in unit being a lifting system, said lifting system moving linearly; and a transfer device for transferring the connecting elements from said supply to said press-in unit.

2. The device according to claim 1, further comprising a brace disposed opposite said press-in unit.

3. The device according to claim 1, further comprising at least one magazine for taking-up and intermediately storing the connecting elements cut from said supply, said magazine disposed upstream of said transfer device.

4. The device according to claim 3, further comprising a conveyor device for conveying the technical wood products and having a longitudinal side, said at least one magazine is one of a plurality of magazines disposed on said longitudinal side of said conveyor device above a plane of conveyance of the technical wood products.

5. The device according to claim 3, further comprising a conveyor device for conveying the technical wood products and having a longitudinal side, said at least one magazine is disposed on said longitudinal side of said conveyor device below a plane of conveyance of the technical wood products.

6. The device according to claim 3, wherein said transfer device serves both as a conveying device for the connecting elements from said magazine to said press-in unit and as a holding device in a press-in operation.

7. The device according to claim 1, wherein said supply is a delivery, sorting, aligning and conveyor device for conveying the connecting elements to said transfer device.

8. The device according to claim 1, further comprising:

a conveyor belt for conveying the technical wood products; and carriers disposed on said conveyor belt, said transfer device functioning in a program-controlled synchronous interacting manner with said carriers for synchronizing the technical wood products on the conveyor belt with the connecting elements.

9. The device according to claim 1, wherein said press-in unit is an oblique plane.

10. The device according to claim 1, wherein said press-in unit is a push-in roller.

11. The device according to claim 1, wherein said press-in unit is a lifting system, said lifting system moves transversely to a direction of feed of the technical wood products.

12. The device according to claim 1, wherein said press-in unit is influenced by a cam runner.

13. A device for inserting wooden or plastic connecting elements in end faces of technical wood products continuously conveyed along the device, the technical wood products having two opposing planar surfaces, the end faces being sides connecting the planar surfaces to each other, the end faces having a relatively small area compared to the two opposing planar surfaces, the end faces having end-face grooves for receiving the connecting elements, the device comprising:

a supply of the connecting elements, whereby the connecting elements are delivered singly;

a press-in unit configured for pressing the connecting elements into the grooves in the end faces of the technical wood products, said press-in unit being a lifting system, said lifting system moving linearly; and a transfer device for transferring the connecting elements from said supply to said press-in unit.

14. A device for inserting wooden or plastic connecting elements in end faces of technical wood products continuously conveyed along the device, the technical wood products having two opposing planar surfaces, the end faces being sides connecting the planar surfaces to each other, the end faces having a relatively small area compared to the two opposing planar surfaces, the end faces having end-face grooves for receiving the connecting elements, the device comprising:

a supply of the connecting elements, whereby the connecting elements are provided in a prefabricated manner;

a press-in unit configured for pressing the connecting elements into the grooves in the end faces of the technical wood products, said press-in unit being a lifting system, said lifting system moving linearly; and a transfer device for transferring the connecting elements from said supply to said press-in unit.

* * * * *